(12) United States Patent
Tanner

(10) Patent No.: US 10,569,462 B2
(45) Date of Patent: Feb. 25, 2020

(54) FEED DEVICE

(71) Applicant: M. TANNER AG, Illnau (CH)

(72) Inventor: Marcel Tanner, Bassersdorf (CH)

(73) Assignee: M. TANNER AG, Illnau (CH)

( * ) Notice: Subject to any disclaimer, the term of this patent is extended or adjusted under 35 U.S.C. 154(b) by 0 days.

(21) Appl. No.: 16/115,043

(22) Filed: Aug. 28, 2018

(65) Prior Publication Data

US 2019/0070768 A1 Mar. 7, 2019

(30) Foreign Application Priority Data

Sep. 7, 2017 (EP) .................................... 17189926

(51) Int. Cl.
| | |
|---|---|
| *B65G 15/14* | (2006.01) |
| *B65G 21/12* | (2006.01) |
| *B65G 23/04* | (2006.01) |
| *B65G 39/14* | (2006.01) |
| *B29C 49/42* | (2006.01) |

(Continued)

(52) U.S. Cl.
CPC .......... *B29C 49/4205* (2013.01); *B65G 15/14* (2013.01); *B65G 21/12* (2013.01); *B65G 23/04* (2013.01); *B65G 23/22* (2013.01); *B65G 39/14* (2013.01); *B29C 49/06* (2013.01); *B29C 2049/024* (2013.01);

(Continued)

(58) Field of Classification Search
None
See application file for complete search history.

(56) References Cited

U.S. PATENT DOCUMENTS

| | | | |
|---|---|---|---|
| 3,951,257 A | | 4/1976 | Storace et al. |
| 4,464,884 A | * | 8/1984 | Franks .................... B65B 59/02 198/415 |

(Continued)

FOREIGN PATENT DOCUMENTS

| | | |
|---|---|---|
| DE | 20308513 U1 | 7/2004 |
| EP | 0642995 A1 | 3/1995 |

(Continued)

OTHER PUBLICATIONS

Extended European Search Report for corresponding European application No. EP 17189926.3, dated Feb. 28, 2018.

*Primary Examiner* — Kavel Singh
(74) *Attorney, Agent, or Firm* — Notaro, Michalos & Zaccaria P.C.

(57) ABSTRACT

A feed device for a conveyor system for preforms which transports the preforms coming in an ordered manner from an upstream module of the conveyor system to a downstream module of the conveyor system in which the preforms are separated into singles, wherein the feed device has at least two oppositely arranged transport rails, on which the preforms rest in each case with a support ring. The feed device additionally includes at least two oppositely arranged belt transport units which preferably engage with a threaded portion of the preforms and transport them in a transport direction to the downstream module of the conveyor system, wherein the belt transport units each have a drive which applies a torque to the preforms accumulated in front of the downstream module, which torque the individual preforms are able to be transferred in a more reliable manner from the feed device into the downstream module.

15 Claims, 5 Drawing Sheets

(51) Int. Cl.
 *B65G 23/22* (2006.01)
 *B29C 49/02* (2006.01)
 *B29C 49/06* (2006.01)

(52) U.S. Cl.
 CPC .............. *B29C 2049/4231* (2013.01); *B65G 2812/02089* (2013.01); *B65G 2812/02148* (2013.01)

(56) References Cited

U.S. PATENT DOCUMENTS

| | | | | |
|---|---|---|---|---|
| 5,249,794 A * | 10/1993 | Plent | ................ | B07C 1/04 |
| | | | | 271/176 |
| 5,624,021 A | 4/1997 | Novak | | |
| 6,634,487 B2 * | 10/2003 | Ritter | ................ | B65B 43/52 |
| | | | | 198/726 |
| 8,365,900 B2 * | 2/2013 | Monti | ................ | B65G 17/44 |
| | | | | 198/698 |
| 8,814,634 B2 * | 8/2014 | Hiraga | ................ | B65G 39/06 |
| | | | | 198/624 |

FOREIGN PATENT DOCUMENTS

| | | |
|---|---|---|
| EP | 0805117 A2 | 11/1997 |
| EP | 1559663 A1 | 8/2005 |
| EP | 2848558 A1 | 3/2015 |
| EP | 3093259 A2 | 11/2016 |
| JP | S50-58073 U | 5/1975 |
| JP | 2007161434 A | 6/2007 |
| JP | 2009107838 A | 5/2009 |
| WO | 2007028627 A2 | 3/2007 |

\* cited by examiner

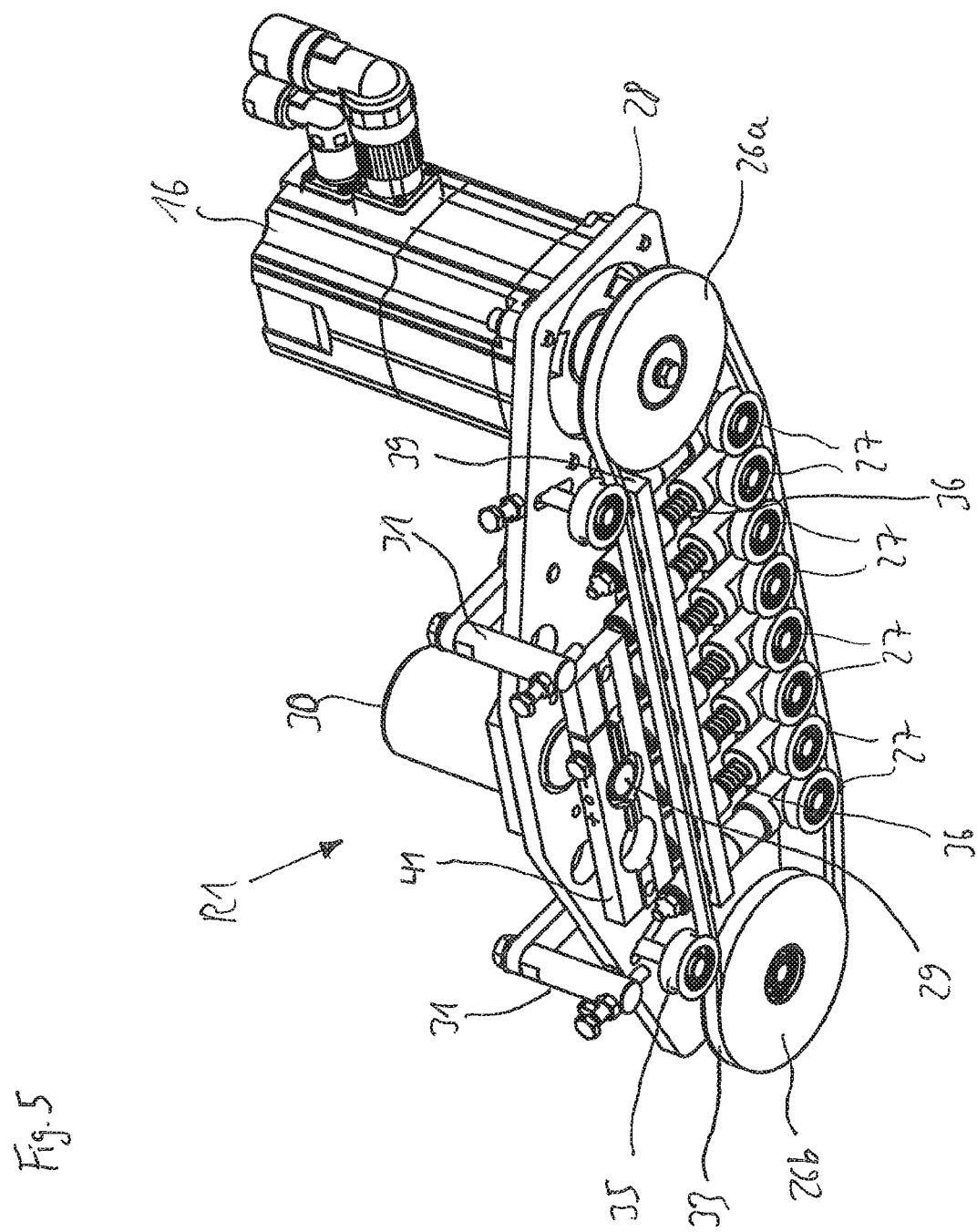

FEED DEVICE

The present invention relates to a feed device for a conveyor system for preforms which transports the preforms coming in an ordered manner from an upstream module of the conveyor system to a downstream module of the conveyor system in which the preforms are separated into singles, wherein the feed device comprises at least two oppositely arranged transport rails, on which the preforms rest in each case with a support ring.

DE 203 08 513 U1 discloses a device for supplying preforms, produced from thermoplastic materials, with a support ring in the region of the open end to a blow-molding machine for producing, in particular, PET plastic bottles. The device comprises a silo which is placed close to the ground for the non-ordered receiving of a plurality of preforms, said silo being periodically filled from above by preforms, delivered in boxes, being poured in. A conventional roller sorter, which has two counter driven, cylindrical rollers and is at a slight downward inclination in the transport direction, is set up close to the silo and also close to the ground. The preforms are removed from the floor of the silo in a non-ordered manner by means of an inclined conveyor and are filled in at the upper end of the roller sorter. The upper end of the roller sorter is situated approximately 1 meter above the ground, the lower end correspondingly lower. The roller sorter is consequently accessible from all sides by a normal sized operator standing on the ground, just as is the inclined conveyor and the outlet region of the silo. In the case of malfunctions in said critical regions, the operator, who is normally standing at the control desk of the stretch blow molder, is able to intervene quickly and eliminate the malfunctions immediately before the stretch blow molder comes to a standstill. An inclined chute, which includes two carrier rails arranged spaced apart from one another, is connected directly upstream of the inlet star of the linear furnace. The preforms rest with their support rings on the carrier rails and, driven by the downhill force, can slip between them in the direction of the inlet star. The chute has a certain buffer function for the purposes of ensuring the stretch blow molder is charged in a reliable gap-free manner and consequently accepts far in excess of 100 preforms. Correspondingly, its upper end lies more than 3 meters above the ground. A height conveyor is interposed to overcome the height difference of approximately 2 meters or more between the outlet of the roller sorter, which forms the preforms, supplied in a non-ordered manner at the upper end, into a single row in the conventional way between its two rollers and aligns them with the open end facing upward, and the upper inlet-side end of the chute.

The disadvantage of said solution is deemed to be that a chute has to be provided after the roller sorter, which chute has to have a considerable height on account of the downhill force or dynamic pressure necessary for the desired gap-free charging of the stretch blow molder. In the event of a malfunction, i.e. if preforms jam, for example, in the upper region of the chute, an operator has to climb a ladder, where applicable, in order to eliminate the malfunction, which can lead to increased down times for the system. Additional air delivery in the region of the chute is also expensive as corresponding air filters are required.

It is consequently the object of the present invention to provide a device which is also set up close to the ground and is able to transfer the preforms, which come in an ordered manner, for instance, from a roller sorter, effectively and reliably to a downstream device for separating into singles (for example a stretch blow molder with an inlet star or an inspection device with an inlet star etc.).

Said object is achieved according to the invention by means of a feed device for a conveyor system for preforms which transports the preforms arriving in an ordered manner from an upstream module of the conveyor system to a downstream module of the conveyor system in which the preforms are separated into singles, wherein the feed device comprises at least two oppositely arranged transport rails on which the preforms rest in each case with a support ring, wherein at least two oppositely arranged belt transport units (a pair), which preferably engage with a threaded portion of the preforms and transport them in a transport direction (T) to the downstream module of the conveyor system, and wherein the belt transport units each comprise a drive which applies a torque to the preforms accumulated in front of the downstream module, by means of which torque the individual preforms are able to be transferred in a more reliable manner from the feed device into the downstream module.

The upstream module and the downstream module are not part of the feed device according to the invention.

The preforms in question here are preferably formed from PET plastic and comprise an outer threaded portion in the region of their opening, to which an outwardly protruding support ring connects, a substantially cylindrical body with a rounded closed end connecting to the support ring.

The feed device according to the invention can be set up, in particular, close to the ground (i.e. for instance between a roller sorter and an inspection device or a stretch blow molder etc.), at an angle of inclination $\alpha$ of approximately between 0° and 8°, preferably between 2° and 6° in relation to the horizontal. The feed device can consequently always be reached in a rapid and convenient manner by an operator.

The feed device also has a buffer function, i.e. it is filled with preforms over its entire length in normal mode (as a rule the accumulation of preforms extends, for example, into the upstream roller sorter). This also applies when four, six or more belt transport units or two, three or more pairs of belt transport units are provided (i.e. two oppositely arranged belt transport units each form one pair in the present case).

In a preferred embodiment of the present invention, the drives of the belt transport units are each realized as servomotors. As a result, a corresponding torque can be applied to the preforms even when the drives of one belt transport unit are at a standstill. The torque remains unchanged without the belt slipping through.

In a preferred manner the torque of a servomotor is between 2.0 Nm and 0.5 Nm, further preferably between 1.0 Nm and 1.5 Nm.

In a further preferred embodiment of the present invention, a sensor S1 (minimum sensor), which detects the presence and absence of preforms and which is preferably connected to a (conventional) control unit, is arranged in the region of the upstream end of the at least two oppositely situated belt transport units. The sensor S1 is regularly realized in the form of a light barrier.

When the sensor S1 no longer detects any preforms in its area, the minimum fill level has been fallen below and an alarm signal is triggered so that possible faults in the upstream units can be eliminated. At the same time, for instance, the blow molder or for instance the inlet star of a clamping conveyor stops, i.e. production is interrupted.

Where there is a total of four (two pairs) or six (three pairs) oppositely arranged belt transport units, in each case a sensor S2 or S3, which detects the presence and absence of preforms and which is preferably connected to the control unit, is also arranged in each case in the region of the upstream end of the third and fourth belt transport units (i.e. of the second pair) or of the upstream end of the fifth and sixth transport units (i.e. of the third pair).

If a gap should appear, i.e. for instance if there is a lack of preforms in the region of the third sensor S3 (of the upstream third pair of belt transport units), for instance the drives of the third pair of belt transport units are actuated at a higher speed in order to supply preforms more quickly and to close the gap created.

In a further preferred embodiment of the present invention, in each case two oppositely arranged air nozzle units (one pair), which support the transport of the preforms in the transport direction (T), are provided in the region of the downstream end of the oppositely arranged belt transport units, preferably below the transport rails.

The air nozzle units, in this regard, preferably comprise inclined or gill-shaped air nozzles which act on the cylindrical bodies of the preforms (i.e. below the support ring) with one or multiple air blasts. This is preferably only required when, in the transition region from one pair of belt transport units to a downstream pair of belt transport units, one or multiple preforms get caught or jam and a gap is thus created. The gap is detected once again by a sensor and the corresponding air nozzle units are activated.

The air nozzle units, where applicable, can also support the transfer of the preforms from the feed rail to the module of the conveyor system connected downstream, i.e. for instance the stretch blow molder or the inspection device.

In a further preferred embodiment of the present invention, at least the transport rails, the belt transport units, the sensors and/or the air nozzle units are adjustable in width by means of a width adjustment device. In this way, the feed device can be adjusted to preforms with different sizes or different diameters.

In a further preferred embodiment of the present invention, the width adjustment device comprises at least two oppositely arranged, lateral fastening profiles which are each mounted on retaining rods which are movable toward and away from one another. As a result, a particularly efficient and precise width adjustment mechanism can be provided.

In a further preferred embodiment of the present invention, the transport rails, the belt transport units, the sensors and/or the air nozzle units are each fastened on the lateral fastening profiles. The lateral fastening profiles preferably each comprise at least two lateral as well as one upper and one lower fastening rail. They are consequently able to be fitted with additional components in a particularly variable manner.

In a further preferred embodiment of the present invention, a height limitation, which is mounted so as to be height adjustable in at least one guide, is provided for the preforms. The height limitation is preferably a C section which is arranged above the opening of the preforms and holds down the preforms in the feed device (as well as preferably also when transferring into the feed device). The C section is mounted in at least one guide in order to prevent lateral pivoting.

In a further preferred embodiment of the present invention, the guide is mounted on an upper fastening profile of the feed device, wherein the height limitation is preferably movable vertically inside the guide by means of a height adjustment element. The upper fastening profile corresponds in a preferred manner to the lateral fastening profiles. The guide for the C section is mounted on its underside and cable channels are preferably mounted on its lateral fastening rails. The height adjustment element is preferably realized in the form of a level arrangement which is actuatable from outside by means of an operating element.

In a further preferred embodiment of the present invention, the belt transport units each comprise a first and a second belt pulley and multiple belt transport rollers for the belt, wherein the first, preferably downstream, belt pulley is driven by the drive. Said arrangement has proved expedient as a reliable transport of the preforms. The drives associated with a pair of belt transport units drive each of the first belt pulleys in a contra-rotating manner, in such a manner that the belts pull the preforms through the feed device in the transport direction (T).

In a further preferred embodiment of the present invention, the first and the second belt pulleys, the multiple belt transport rollers and the drive are mounted on a mounting plate of the belt transport unit. In this way, the belt transport units can be mounted in a particularly easy and variable manner on the lateral profiles.

In a further preferred embodiment of the present invention, the belt transport rollers are mounted in a spring preloaded manner (or by means of spacer sleeves) on a web on the underside of the mounting plate. As a result, the necessary pressing force for reliably transporting the preforms (i.e. preferably in the region of their threaded portions) is ensured by the corresponding oppositely situated belt portions on the inside of the belt transport units.

In a further preferred embodiment of the present invention, the mounting plate is adjustable in height in relation to the respective lateral fastening profile. This enables the already mounted belt transport unit to be finely adjusted. In a particularly preferred manner, a rotary cylinder with a spindle device is arranged on the mounting plate for this purpose, which rotary cylinder is easily operable manually from the outside.

For the purposes of clarity, exemplary embodiments of the present invention are illustrated in the accompanying drawings, in which:

FIG. 5 shows a single view of a belt transport unit for a feed device according to the invention.

FIG. 1 shows, as an example, a conveyor system 1 in which the feed device 10 according to the invention is integrated. Such a conveyor system is provided, for instance, in order to move preforms ultimately into a stretch blow molder.

Figure 1:
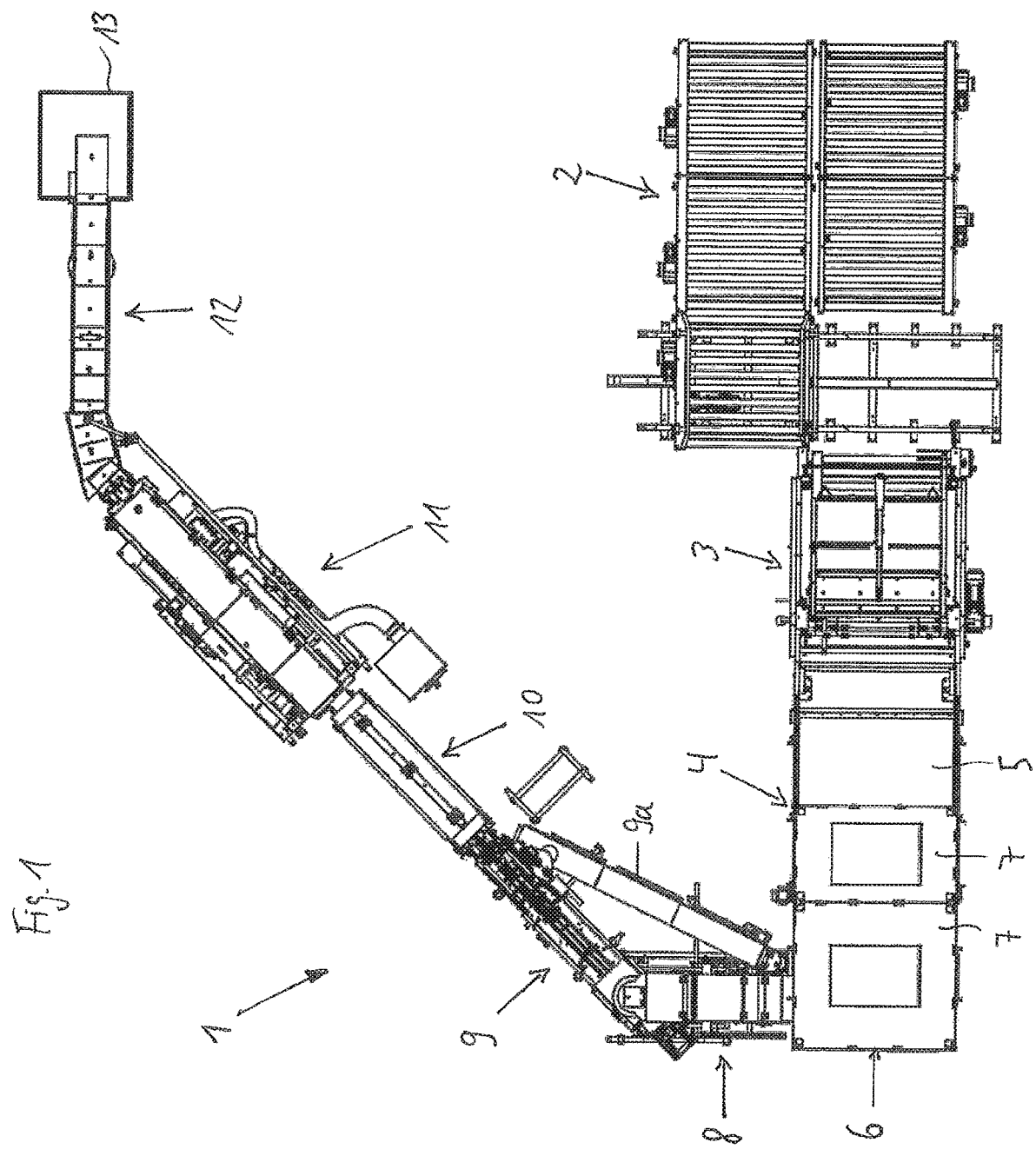
FIG. 1 shows a top view of an exemplary conveyor system for preforms, in which the feed device according to the invention is integrated.

Boxes with the preforms are moved, in this case, via the roller belt conveyor 2 to the tilting device 3 which receives one box in each case and pours out the contents, i.e. the preforms, onto a conveyor belt device 4. The conveyor belt device 4 includes a first conveyor belt 5, a funnel-like device 6 and a second (transverse) conveyor belt which is arranged below the funnel-like device 6. The first conveyor belt 5 and the funnel-like device 6 each comprise a cover 7. The second conveyor belt transfers the preforms in an unordered manner to a vertical conveyor 8. A conventional roller sorter 9 with a return belt 9a connects to the vertical conveyor 8. The feed device 10 according to the invention, which takes the correctly aligned preforms over from the roller sorter 9 and guides them to an inlet star of an inspection and rejection unit of a clamping conveyor 11, is provided downstream of the roller sorter 9. Another discharge rail 12, by means of which the preforms, separated into singles, move into the stretch blow molder 13, which is only shown schematically here, is also connected, for instance, to the clamping conveyor 11. The feed device according to the invention 10 can naturally also guide the preforms directly to a stretch blow molder 13 or to the inlet star thereof.

Figure 2:
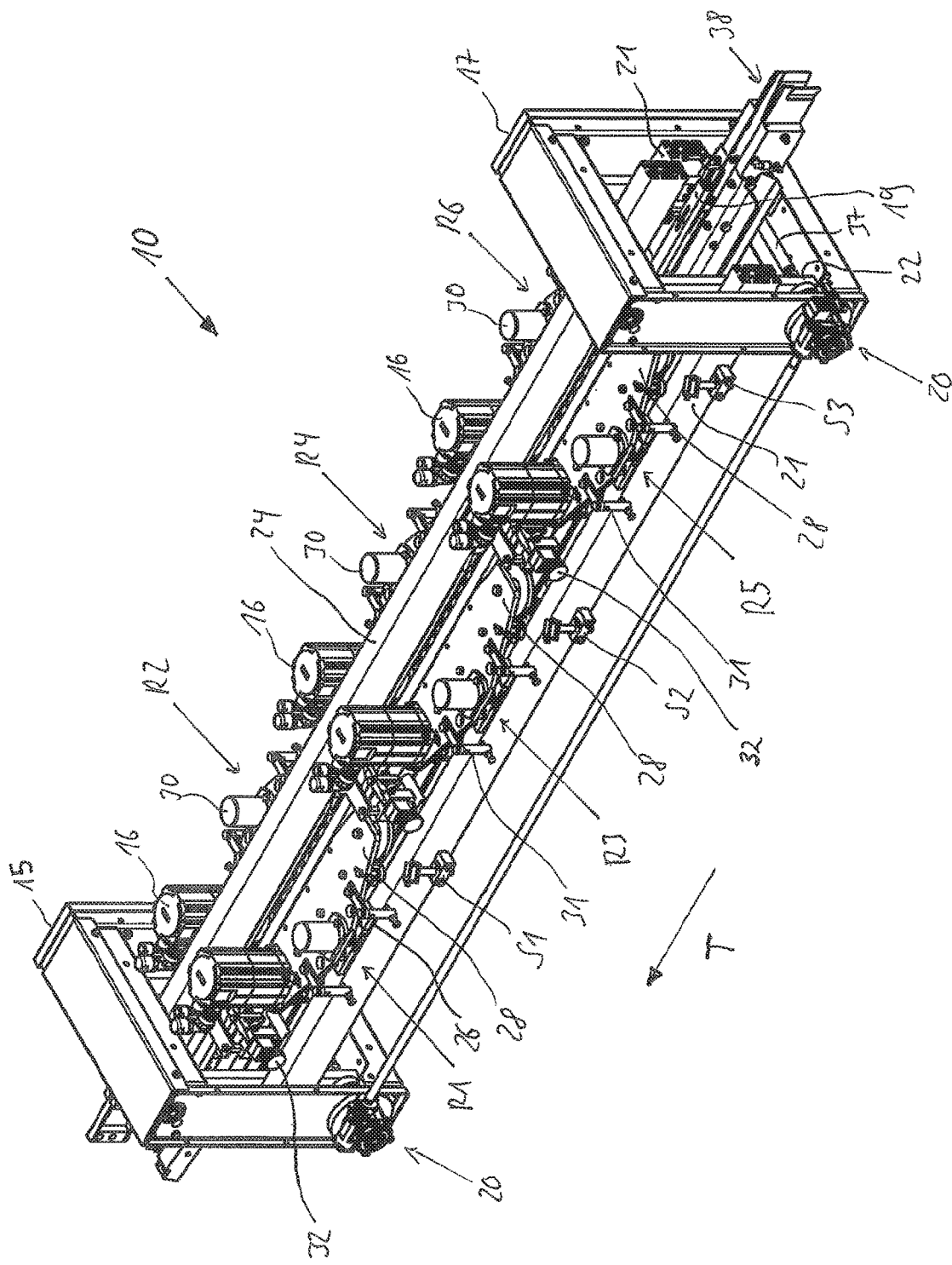
FIG. 2 shows a perspective view of the feed device according to the invention.

A perspective view of a feed device 10 according to the invention is illustrated in FIG. 2. The feed device 10 according to the invention comprises two frames 15 and 17 which include a width adjustment device 20. The width adjustment device 20 includes two retaining rods 22, which can be moved toward and away from one another by means of a spindle 37 via a rotary knob of the width adjustment device 20.

A lateral fastening profile 21 is mounted on each of the retaining rods 22, wherein further elements of the feed device 10 are fastened on each of the lateral fastening profiles 21. Width adjustment is necessary when the feed device 10 according to the invention has to be converted to a different preform size.

The preforms pass, for example, from a roller sorter via the transfer portion 38 into the feed device 10 according to the invention 10 and are forwarded in the transport direction T. A height limitation 19 for the preforms in the form of a C section, which presses the preforms down when they are being transported by the feed device 10 according to the invention, can be seen above the transfer portion 38. The height limitation 19 is mounted on an upper fastening profile 24 which is fastened in turn (immovably) on the frames 15 and 17. The height limitation 19 is adjustable via the height adjustment means 32.

The belt transport units R1, R2, R3, R4, R5 and R6 are mounted on the lateral fastening profiles 21. The belt transport units R1, R2, R3, R4, R5 and R6 are additionally secured against pivoting by means of lateral supports 31 on the outside of the lateral fastening profiles 21. It is possible to see each of the drives 16 of the individual belt transport units R1, R2, R3, R4, R5 and R6 as well as rotary cylinders 30 which enable the individual belt transport units R1, R2, R3, R4, R5 and R6 to be height-adjusted relative to the lateral fastening profiles 21.

A sensor S1, S2 or S3, which detects the presence or absence of preforms in its area, is provided on each upstream end between the belt transport units R1 and R2, R3 and R4 as well as R5 and R6. The sensors S1, S2 and S3 are realized in the present case in the form of light barriers and are connected to a conventional control unit (not shown).

In normal mode, the feed device 10 according to the invention is filled with preforms over its entire length, i.e. the preforms accumulate upstream beyond the sensor S3 (i.e. as a rule into the roller sorter or another module connected upstream). The drives 16 apply a certain torque onto the accumulated preforms with a view to transferring the preforms to the unit of the conveyor system connected downstream in a fault-free manner. In this respect, the drives are preferably realized as servomotors. The torque remains unchanged without the belts 33 slipping through.

However, if the sensor S3 then indicates a gap, i.e. no more preforms are situated in its area, the drives 16 of the belt transport units R5 and R6, for instance, are actuated at a greater speed in order to deliver preforms.

If the sensor S1 (minimum sensor) no longer detects a preform in its area, the minimum fill level has been fallen below and an alarm signal is triggered so that possible faults in the units connected upstream can be eliminated. At the same time, for instance, the blow molder or for instance the inlet star of a clamping conveyor stops, i.e. production is interrupted.

Figure 3:
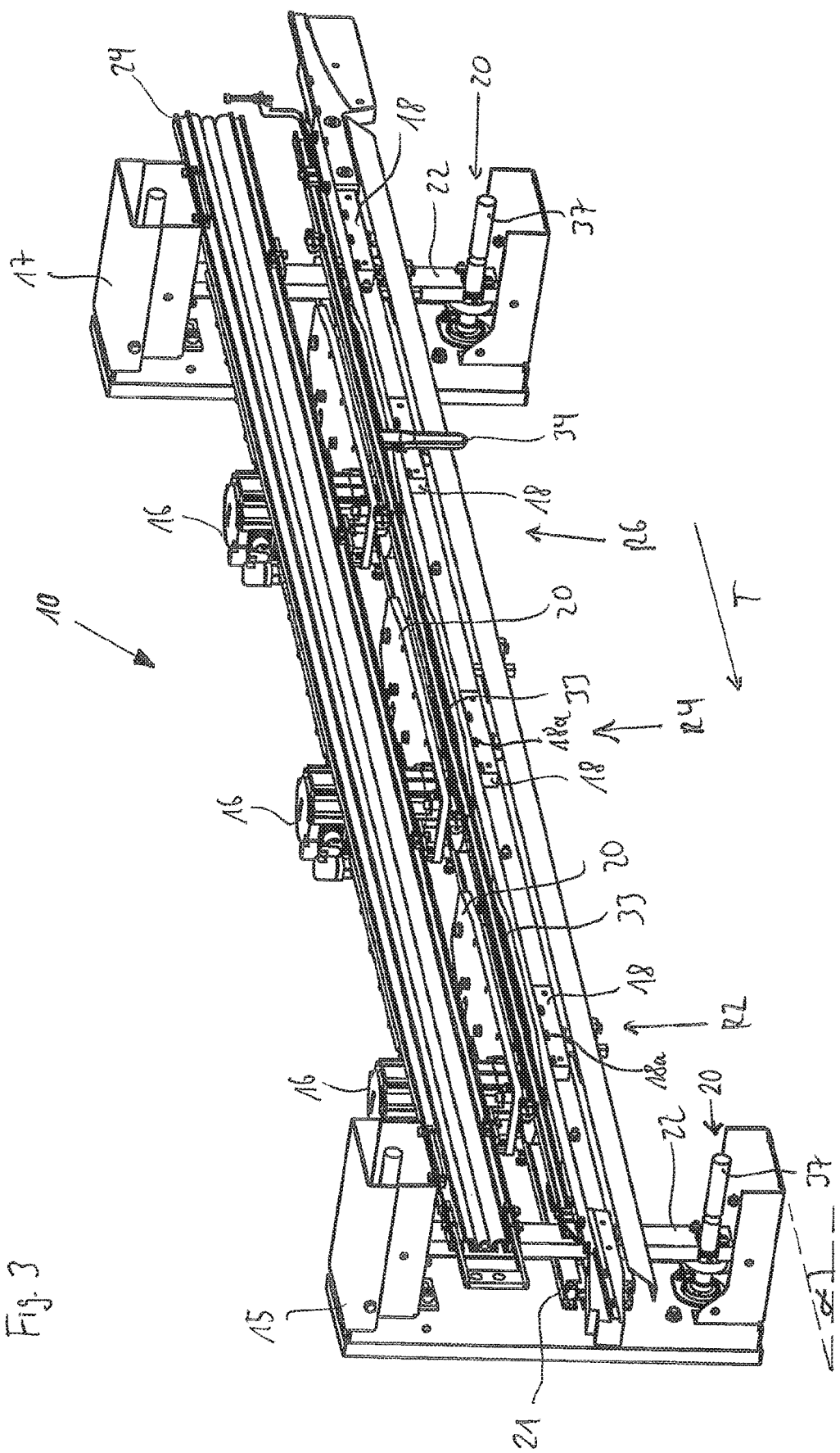
FIG. 3 shows a perspective view of a detail of the feed device according to the invention.

FIG. 3 shows a perspective view of a detail of the feed device 10 according to the invention, the front part of the frames 15 and 17 as well as the front lateral fastening profile 21 with the belt transport units R1, R2 and R3 have been broken open.

It is possible to see the belt transport units R2, R4 and R6 with the belts 33 as well as the mounting plates 20, on which the drives or the servomotors 16 are arranged. Air nozzle units 18 are arranged on the lateral profile 21 below the belt transport units R2, R4 and R6 (preferably in the region of the downstream end of the belt transport units R2, R4 and R6). The air nozzle units 18 comprise inclined or gill-like air nozzles 18a which support the preforms by means of one or multiple air blasts, where applicable, when they are transferred from one belt transport unit to the next (i.e. in particular when the preforms get caught or jam in the region between two belt transport units). However, the air nozzle units 18 are also able to be operated continuously.

In addition, it is also possible to see the retaining rods 22 and the spindles 37 of the width adjustment device 20, by means of which the lateral profile 21, and with it the belt transport units R2, R4 and R6, are able to be moved forward and backward. In addition, a preform 34, which engages the belt 33 of the belt transport unit R6 in the region of its threaded portion and which is transported in the transport direction T by the feed device 10 according to the invention, is shown as an example. The nozzles 18a of the air nozzle 18 act on the preform 34 for instance in the region below the support ring.

The feed device 10 according to the invention is also able to be placed, in particular, close to the ground (i.e. for instance between a roller sorter and an inspection device or a stretch blow molder etc.), at an angle of inclination α of approximately between 0° and 8°, preferably between 2° and 6° in relation to the horizontal. The feed device 10 according to the invention can consequently be reached quickly and conveniently at all times by an operator.

Figure 4:
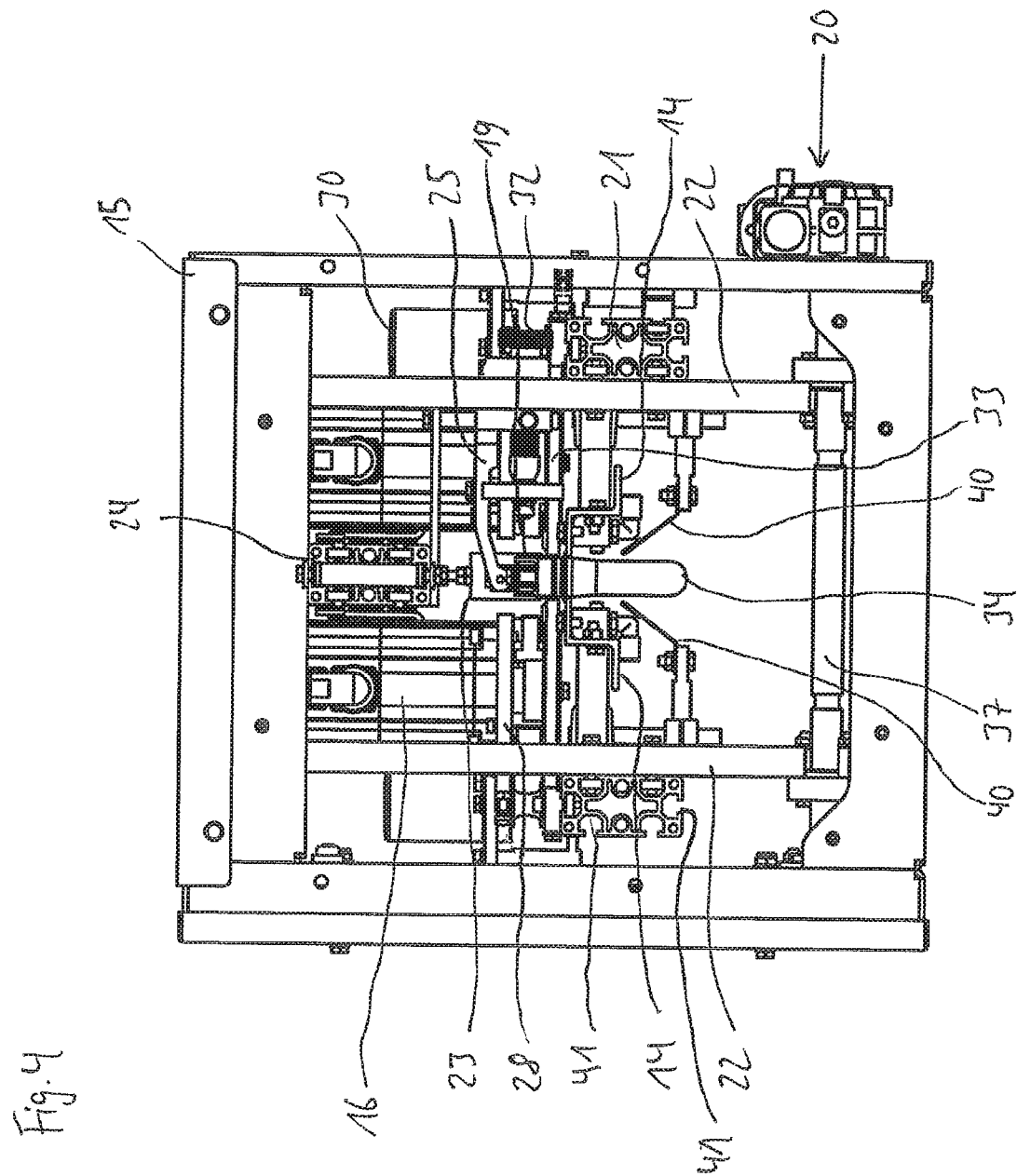
FIG. 4 shows a front view of a feed device according to the invention from the downstream end.

FIG. 4 shows a front view of the feed device 10 according to the invention (from the downstream end). Once again it is possible to see the frame 15 with the width adjustment device 20, by means of which the lateral profiles 21 mounted on the retaining rods 22 can be moved via the spindle 37 toward one another or away from one another.

On the one hand, lateral guides 40 for the cylindrical body of the preform 34 are arranged on the lateral profiles 21 in order to prevent the preform 34 tilting. The preform 34 rests with its support ring on the transport rails 14 which are realized, for instance, as a Z section and are also mounted on the lateral profiles 21. The height limitation 19, which is to prevent vertical movements of the preform 34, is provided above the preform 34. The lateral fastening profile 21 and the upper fastening profile 24 each comprise six fastening rails 41 (one upper, one lower and two side ones each).

The height limitation 19 is mounted in a guide 23 which is mounted on the fastening profile 24. The height limitation 19 can be adjusted vertically inside the guide 23 by means of the height adjustment means 32 or the lever arrangement 25. The drives 16 of the belt transport units R1 and R2 arranged on the mounting plates 28 can also be seen. Next to the drives 16 it is possible to see the rotary cylinders 30, by means of which the belt transport units R1 and R2 are adjustable in height relative to the lateral fastening profiles 21.

FIG. 5 finally illustrates a single view of the belt transport unit R1 as an example. The drive 16 and the rotary cylinders 30 are arranged on the mounting plate 28. The drive 16 drives the first belt pulley 26a. The belt 33 runs around the first belt pulley 26a and the—non-driven—second belt pulley 26b.

Belt transport rollers 27, which are mounted by means of springs (or spacer sleeves) 36 in a preloaded manner on a web 39 on the underside of the mounting plate 28, are provided additionally on the inside. In this way, a sufficient pressing force is always exerted onto the preforms via the belt 33 in order to be able to transport them in a reliable manner.

A belt tightener 35, by means of which the tension of the belt 33 can be adapted, is arranged on the outside in the region of each of the first and second belt pulleys 26a and 26b. The belt tighteners 35 are fastened on the mounting plate 28. The two lateral supports 31, which support the belt transport unit R1, as can be seen for instance in FIG. 2, against the lateral fastening profile 21 and thus secure it against unwanted pivoting, are also fastened on the mounting plate 28.

The belt transport unit R1 is connected to the lateral fastening profile 21 via the connection plate 41 (on the upper side thereof), as can be seen, for instance in FIG. 2. The belt transport unit R1 can be adjusted in height relative to the lateral fastening profile 21 via the rotary cylinder 30 and a corresponding spindle device 29 (cf. the markings "+", "0" and "−" on the outside of the connection plate 41).

LIST OF REFERENCES

1 Conveyor system
2 Roller belt conveyor
3 Tilting device
4 Conveyor belt device
5 First conveyor belt
6 Funnel-like device
7 Cover
8 Vertical conveyor
9 Roller sorter
10 Feed device
11 Clamping conveyor
12 Discharge rail
13 Stretch blow molder
14 Transport rails
15 Frame
16 Drives (servomotors)
17 Frame
18 Air nozzle units
19 Height limitation
21 Lateral fastening profiles
22 Retaining rods
23 Guide
24 Upper fastening profile
25 Height adjustment element/lever arrangement
26a, b Belt pulleys
27 Belt transport rollers
28 Mounting plate
29 Spindle device
30 Rotary cylinder
31 Lateral supports
32 Height adjustment
33 Belt
34 Preform
35 Belt tightener
36 Springs or spacer sleeves
37 Spindle
38 Transfer portion
39 Web—underside of mounting plate
40 Lateral guides
41 Connection plate
α Angle of inclination
S1-3 Sensors
R1-6 Belt transport units
T Transport direction

The invention claimed is:

1. A feed device for a conveyor system for preforms for plastic bottles which transports the preforms arriving in an ordered manner from an upstream module of the conveyor system to a downstream module of the conveyor system in which the preforms are separated into singles, wherein
   the feed device (10) comprises at least two oppositely arranged transport rails (14), on which the preforms rest in each case with a support ring, characterized by
   at least two oppositely arranged belt transport units (R1, R2) which preferably engage with a threaded portion of the preforms and transport them in a transport direction (T) to the downstream module of the conveyor system,
   wherein the feed device has a buffer function configured to provide that it is filled with preforms over its entire length in normal mode, and
   wherein the belt transport units (R1, R2) each comprise a drive (16) which applies a torque to the preforms accumulated in front of the downstream module, by means of which torque the individual preforms are able to be transferred in a more reliable manner from the feed device (10) into the downstream module, wherein the drive (16) is realized in each case as a servomotor configured to provide that the corresponding torque is applied to the preforms even when the drives are at a standstill.

2. The feed device as claimed in claim 1, wherein the torque of the servomotor is preferably between 0.5 Nm and 2.0 Nm, even more preferred between 1.0 Nm and 1.5 Nm.

3. The feed device as claimed in claim 1, wherein a sensor (S1), which detects the presence and absence of preforms and which is preferably connected to a control unit, is arranged in the region of the upstream end of the at least two oppositely situated belt transport units (R1, R2).

4. The feed device as claimed in claim 3, wherein where there are four (R1, R2, R3, R4) or six (R1, R2, R3, R4, R5, R6) oppositely arranged belt transport units, in each case a sensor (S2, S3), which detects the presence and absence of preforms and which is preferably connected to the control unit, is arranged in each case in the region of the upstream end of the third and fourth belt transport units (R3, R4) or of the fifth and sixth transport units (R5, R6).

5. The feed device as claimed in claim 1, wherein in each case two oppositely arranged air nozzle units (18), which support the transport of the preforms in the transport direction (T), are provided in the region of the downstream end of the oppositely arranged belt transport units (R1, R2, R3, R4, R5, R6), preferably below the transport rails (14).

6. The feed device as claimed in claim 4, wherein in each case two oppositely arranged air nozzle units (18), which support the transport of the preforms in the transport direction (T), are provided in the region of the downstream end of the oppositely arranged belt transport units (R1, R2, R3, R4, R5, R6), wherein at least the transport rails (14), the belt transport units (R1, R2, R3, R4, R5, R6), the sensors (S1, S2, S3) and/or the air nozzle units (18) are adjustable in width by means of a width adjustment device (20).

7. The feed device as claimed in claim 6, wherein the width adjustment device (20) comprises at least two oppositely arranged, lateral fastening profiles (21) which are each mounted on retaining rods (22) which are movable toward and away from one another.

8. The feed device as claimed in claim 7, wherein the transport rails (14), the belt transport units (R1, R2, R3, R4, R5, R6), the sensors (S1, S2, S3) and/or the air nozzle units (18) are each fastened on the lateral fastening profiles (21).

9. The feed device as claimed in claim 1, wherein a height limitation (19), which is mounted so as to be height adjustable in at least one guide (23), is provided for the preforms.

10. The feed device as claimed in claim 9, wherein the guide (23) is mounted on an upper fastening profile (24) of the feed device (10) and wherein the height limitation (19) is preferably movable vertically inside the guide (23) by means of a height adjustment element (25).

11. The feed device as claimed in claim 1, wherein the belt transport units (R1, R2, R3, R4, R5, R6) each comprise a first and a second belt pulley (26a, 26b) and multiple belt transport rollers (27), wherein the first, preferably downstream, belt pulley (26a) is driven by the drive (16).

12. The feed device as claimed in claim 11, wherein the first and the second belt pulleys (26a, 26b), the multiple belt transport rollers (27) and the drive (16) are mounted on a mounting plate (28) of the belt transport unit (R1, R2, R3, R4, R5, R6).

13. The feed device as claimed in claim 12, wherein the belt transport rollers (27) are mounted in a spring preloaded manner on the mounting plate (28) of the belt transport unit (R1, R2, R3, R4, R5, R6).

14. The feed device as claimed in claim 12, wherein the mounting plate (28) is adjustable in height in relation to the respective lateral fastening profile (21).

15. The feed device as claimed in claim 14, wherein a rotary cylinder (30) with a spindle device (29) is arranged on the mounting plate (28) for the height adjustment.

* * * * *